United States Patent
Nishimura

(10) Patent No.: US 10,821,793 B2
(45) Date of Patent: Nov. 3, 2020

(54) SUSPENSION BUSH AND SUSPENSION DEVICE

(71) Applicant: HONDA MOTOR CO., LTD., Tokyo (JP)

(72) Inventor: Tetsuji Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/481,612

(22) PCT Filed: Oct. 18, 2017

(86) PCT No.: PCT/JP2017/037623
§ 371 (c)(1),
(2) Date: Jul. 29, 2019

(87) PCT Pub. No.: WO2018/142683
PCT Pub. Date: Aug. 9, 2018

(65) Prior Publication Data
US 2019/0366788 A1 Dec. 5, 2019

(30) Foreign Application Priority Data

Jan. 31, 2017 (JP) .................. 2017-015337

(51) Int. Cl.
*B60G 7/02* (2006.01)
*B60G 9/04* (2006.01)
(Continued)

(52) U.S. Cl.
CPC .............. *B60G 7/02* (2013.01); *B60G 9/04* (2013.01); *F16C 17/18* (2013.01); *F16C 33/22* (2013.01); *F16F 1/387* (2013.01); *F16F 15/08* (2013.01)

(58) Field of Classification Search
CPC .... B60G 7/02; B60G 9/04; B60G 2204/4104; B60G 2204/41; B60G 2204/4106;
(Continued)

(56) References Cited

U.S. PATENT DOCUMENTS 3,392,971 A * 7/1968 Herbenar ................. B60G 7/02
267/269
3,561,830 A * 2/1971 Orndorff .............. B63H 23/321
384/98
(Continued)

FOREIGN PATENT DOCUMENTS

EP 0905405 A1 3/1999
JP H03-092632 A 4/1991
(Continued)

OTHER PUBLICATIONS

PCT/ISA/210 from PCT/JP2017/037623 with the English translation thereof.

*Primary Examiner* — Darlene P Condra
(74) *Attorney, Agent, or Firm* — Carrier Blackman & Associates, P.C.; Joseph P. Carrier; Fulchand P. Shende

(57) ABSTRACT

Provided are a suspension bush and a suspension device that are able to achieve both steering operability and stability of a vehicle at the time of turning. A projection portion is formed on the outer circumference of an inner cylinder. A guide is formed on the inner circumference of an outer cylinder. In the guide, a slit is formed along an extending direction that includes: a component, in a parallel direction, which runs parallel with an axial line; and a component in a circumferential direction around the axial line. The projection portion is disposed in the slit, and a threaded mechanism is formed by the projection portion and the slit.

5 Claims, 13 Drawing Sheets

(51) Int. Cl.
*F16C 17/18* (2006.01)
*F16C 33/22* (2006.01)
*F16F 1/387* (2006.01)
*F16F 15/08* (2006.01)

(58) Field of Classification Search
CPC ........ B60G 2200/20; B60G 2204/1434; B60G 21/052; F16C 17/18; F16C 33/22; F16F 1/387; F16F 15/08; F16F 1/38
See application file for complete search history.

(56) References Cited

U.S. PATENT DOCUMENTS

| | | | |
|---|---|---|---|
| 4,290,656 A * | 9/1981 | Daugherty | B63H 23/326 384/286 |
| 5,100,114 A | 3/1992 | Reuter et al. | |
| 2012/0237146 A1 * | 9/2012 | Tange | F16C 33/22 384/37 |

FOREIGN PATENT DOCUMENTS

| | | |
|---|---|---|
| JP | H05-058990 U | 8/1993 |
| JP | H08-132836 A | 5/1996 |
| JP | H09-210107 A | 8/1997 |
| JP | 2002-098191 A | 4/2002 |
| JP | 2008-189078 A | 8/2008 |
| JP | 2008-201241 A | 9/2008 |
| JP | 2010-054017 A | 3/2010 |
| JP | 2013-050176 A | 3/2013 |
| JP | 2014-097771 A | 5/2014 |

\* cited by examiner

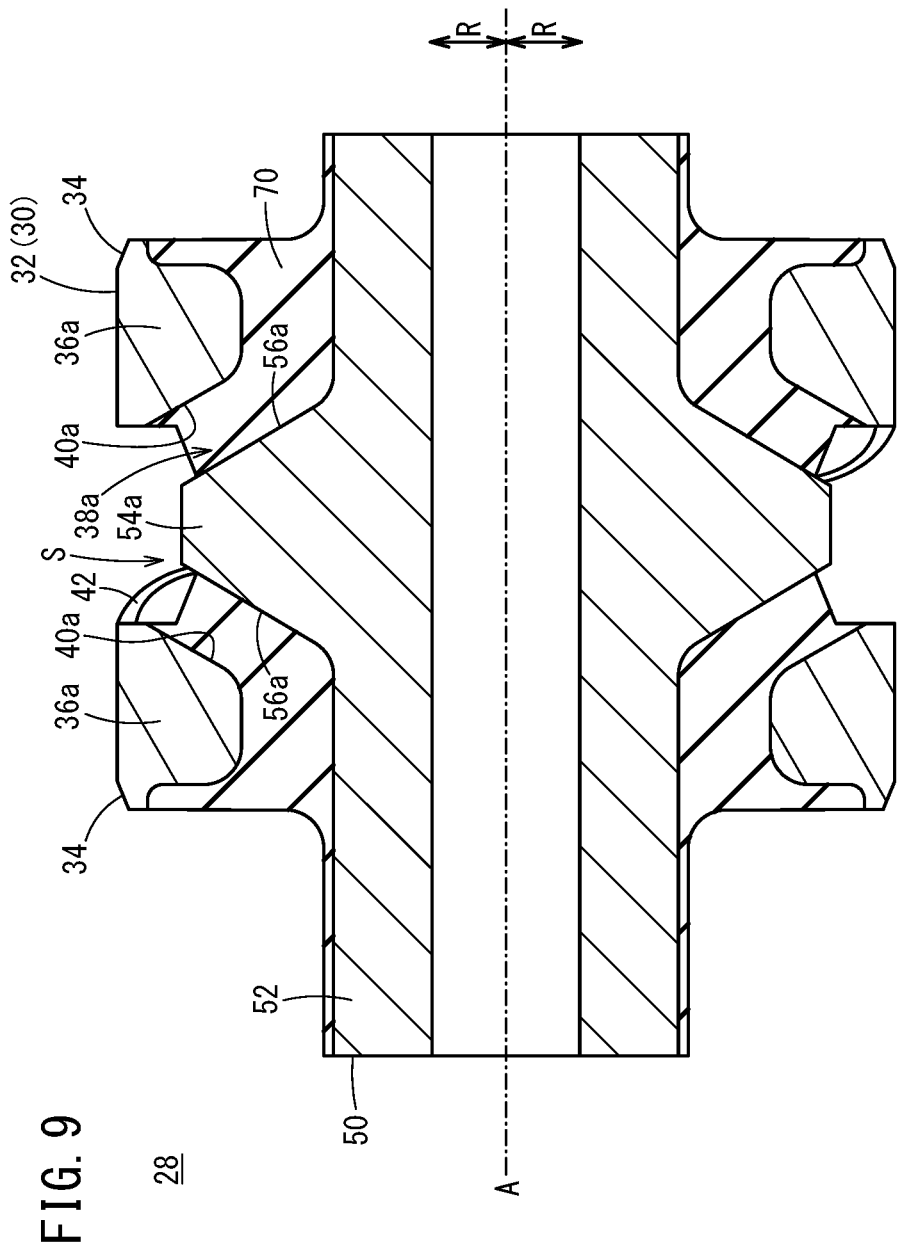

SUSPENSION BUSH AND SUSPENSION DEVICE

TECHNICAL FIELD

The present invention relates to a suspension bush installed between a vehicle body and a suspension arm, and a suspension device of the torsion beam type using a suspension bush.

BACKGROUND ART

Japanese Laid-Open Patent Publication No. 2014-097771 describes a suspension device of the torsion beam type used as rear suspensions for front-wheel drive vehicles. The suspension device is supported to be vertically swingable with respect to the body of a vehicle using suspension bushes. The suspension bushes each include an inner cylinder attached to the body, an outer cylinder attached to a suspension arm, and an elastic member with which a space between the inner cylinder and the outer cylinder is filled. Japanese Laid-Open Patent Publication Nos. 2008-189078 and 2010-054017 describe suspension bushes including projections on the outer circumferences of inner cylinders as modes of suspension bushes.

SUMMARY OF INVENTION

When a vehicle turns, force in the lateral direction (direction toward the inside of the turn; lateral force) acts on the rear wheels. When a suspension device is displaced in the lateral direction in response to the lateral force, handling of the vehicle is impaired. It is necessary that the suspension device resist the lateral force while the vehicle turns to keep the handling of the vehicle. On the other hand, for the vehicle to travel stably while the vehicle turns, it is necessary that the toe angles of the rear wheels be changed toward the inside of the turn. That is, to provide the handling and stability of the vehicle in a compatible manner while the vehicle turns, it is necessary that the suspension device on the rear side resist the lateral force and, at the same time, that the toe angles be changed toward the inside of the turn.

The suspension device described in Japanese Laid-Open Patent Publication No. 2014-097771 cannot resist the lateral force. Thus, the handling of the vehicle is impaired. If the suspension bushes described in Japanese Laid-Open Patent Publication Nos. 2008-189078 and 2010-054017 are used in the suspension device described in Japanese Laid-Open Patent Publication No. 2014-097771, the suspension device may be able to resist the lateral force. On the other hand, however, it would be more difficult to change the toe angles toward the inside of the turn. Consequently, conventional suspension devices and suspension bushes cannot provide the handling and stability of the vehicle in a compatible manner while the vehicle turns.

The present invention has been devised taking into consideration the aforementioned problems, and has the object of providing a suspension bush and a suspension device capable of providing excellent handling and stability of a vehicle in a compatible manner while the vehicle turns.

According to the present invention, a suspension bush includes an inner cylinder and an outer cylinder aligned with each other on an identical axis and an elastic member lying between the inner cylinder and the outer cylinder, wherein a projection is formed on an outer circumference of the inner cylinder, a guide is formed on an inner circumference of the outer cylinder, a slit is formed in the guide in a drawing direction including a parallel component parallel to the axis and a circumferential component with the axis at a center, the projection is disposed in the slit, and the projection and the slit form a screw mechanism.

In the above-described structure, in a case where an external force in a parallel direction parallel to the axis acts on the outer cylinder, the projection restricts the movement of the guide to thereby prevent the displacement of the outer cylinder in the parallel direction. Moreover, in a case where an external force in a circumferential direction with the axis at the center acts on the outer cylinder, the projection restricts the movement of the guide to thereby allow the outer cylinder to be displaced in the parallel direction while the outer cylinder rotates in the circumferential direction.

According to the above-described structure, in the case where the external force in the parallel direction parallel to the axis acts on the outer cylinder, the outer cylinder can be prevented from being displaced along the axis. Moreover, in the case where the external force in the circumferential direction acts on the outer cylinder, the outer cylinder can be displaced along the axis while rotating. A suspension device of the torsion beam type using the suspension bush enables toe angles to be changed toward the inside of a turn while resisting lateral force generated during the turn. This provides excellent handling and stability of the vehicle in a compatible manner while the vehicle turns.

The outer cylinder may include a plurality of split members divided in a radial direction of the outer cylinder. According to the above-described structure, the projection of the inner cylinder can be easily disposed in the slit of the outer cylinder compared with a case using an integrally-formed outer cylinder.

In the suspension bush according to the present invention, in a plane cross section including the axis and parallel to the axis, a guide wall located adjacent to the slit may be inclined with respect to the radial direction of the outer cylinder, a projection wall located adjacent to the slit may be inclined with respect to a radial direction of the inner cylinder, and the guide wall and the projection wall facing each other may be inclined in an identical direction. According to the above-described structure, the elastic member lying between the guide wall and the projection wall receives compressive load from the guide wall and the projection wall. Thus, the durability of the elastic member is increased compared with a case including the guide wall that is not inclined with respect to the radial direction of the outer cylinder and the projection wall that is not inclined with respect to the radial direction of the inner cylinder.

According to the present invention, a suspension device of a torsion beam type for supporting a pair of left and right trailing arms using suspension bushes so as to be swingable with respect to a body of a vehicle is provided, wherein axes of the suspension bushes extend toward a back of the body as the axes extend from an inside to an outside in a width direction of the vehicle, wherein each of the suspension bushes includes an inner cylinder attached to the body, an outer cylinder aligned with the inner cylinder on an identical axis and attached to the corresponding trailing arm, and an elastic member lying between the inner cylinder and the outer cylinder, wherein a projection is formed on an outer circumference of the inner cylinder, wherein a guide is formed on an inner circumference of the outer cylinder, wherein a slit is formed in the guide in a drawing direction including a parallel component parallel to the axis and a circumferential component with the axis at a center, wherein the projection is disposed in the slit, wherein the projection and the slit form a screw mechanism, and wherein of the pair of left and right trailing arms, the screw mechanism of the suspension bush provided on the left trailing arm disposed on a left side of the body is a left-handed screw mechanism, and the screw mechanism of the suspension bush provided on the right trailing arm disposed on a right side of the body is a right-handed screw mechanism.

Moreover, according to the present invention, a suspension device of a torsion beam type for supporting a pair of left and right trailing arms using suspension bushes so as to be swingable with respect to a body of a vehicle is provided, wherein axes of the suspension bushes extend toward a front of the body as the axes extend from an inside to an outside in a width direction of the vehicle, wherein each of the suspension bushes includes an inner cylinder attached to the body, an outer cylinder aligned with the inner cylinder on an identical axis and attached to the corresponding trailing arm, and an elastic member lying between the inner cylinder and the outer cylinder, wherein a projection is formed on an outer circumference of the inner cylinder, wherein a guide is formed on an inner circumference of the outer cylinder, wherein a slit is formed in the guide in a drawing direction including a parallel component parallel to the axis and a circumferential component with the axis at a center, wherein the projection is disposed in the slit, wherein the projection and the slit form a screw mechanism, and wherein of the pair of left and right trailing arms, the screw mechanism of the suspension bush provided on the left trailing arm disposed on a left side of the body is a right-handed screw mechanism, and the screw mechanism of the suspension bush provided on the right trailing arm disposed on a right side of the body is a left-handed screw mechanism.

According to the above-described structure, the outer cylinder of each suspension bush can be prevented from being displaced along the axis in a case where lateral force acts on the wheels at the beginning of a turn. Moreover, in a case where the wheels bump or rebound to thereby cause an external force in a circumferential direction to act on the outer cylinder of each suspension bush, the outer cylinder can be displaced along the axis while rotating. Thus, the suspension device enables toe angles to be changed toward the inside of the turn while resisting the lateral force generated during the turn. This provides excellent handling and stability of the vehicle in a compatible manner while the vehicle turns.

According to the present invention, excellent handling and stability of the vehicle can be provided in a compatible manner while the vehicle turns.

BRIEF DESCRIPTION OF DRAWINGS

FIG. 9 is a cross-sectional view of a suspension bush of a second embodiment, and corresponds to a cross-sectional view take along line IV-IV in FIG. 3;

DESCRIPTION OF EMBODIMENTS

Preferred embodiments of a suspension bush and a suspension device according to the present invention will be described in detail below with reference to the accompanying drawings.

1 Structure of Suspension Device 10

Figure 1:
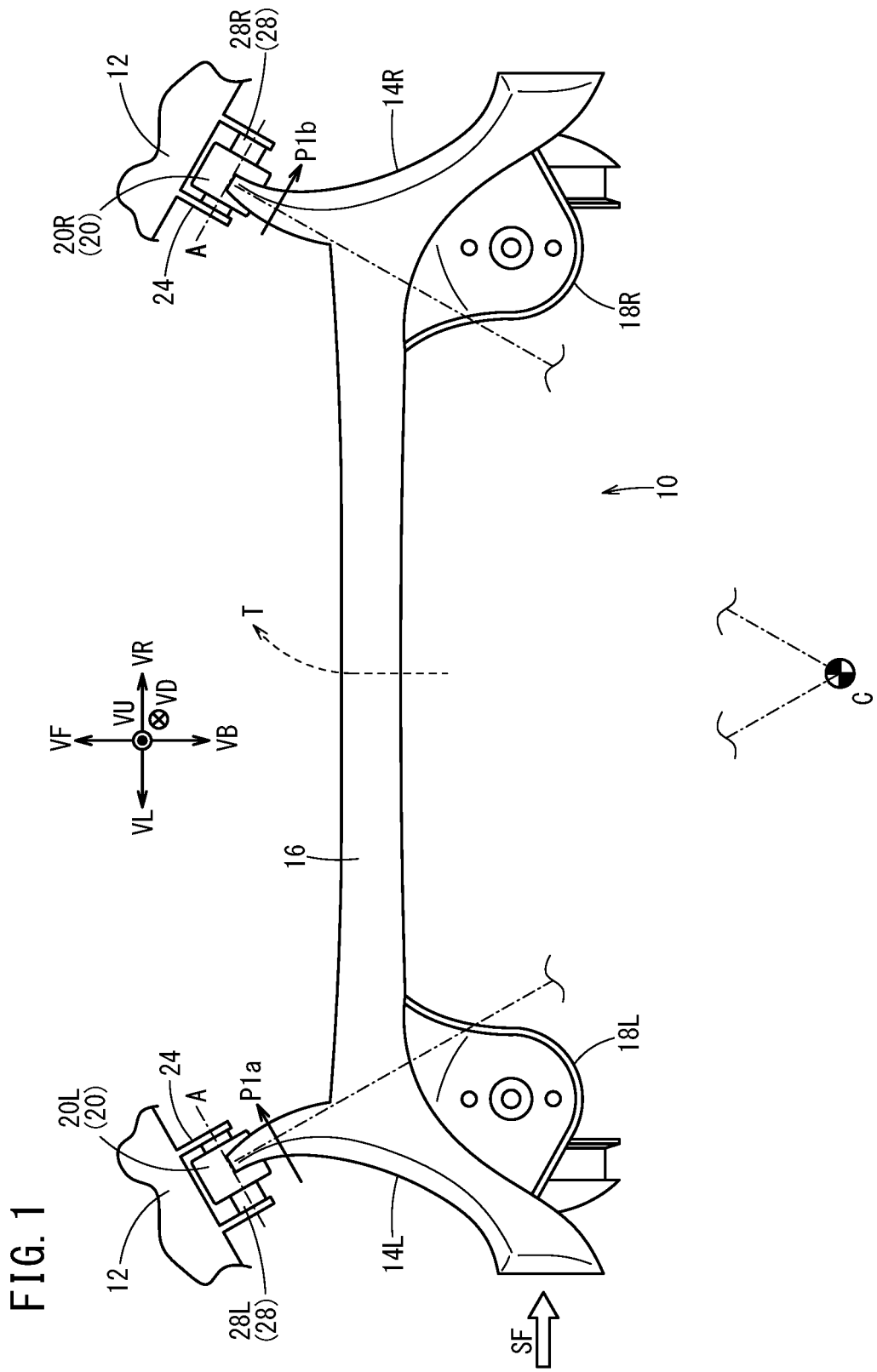
FIG. 1 is a plan view of a suspension device according to the present invention.

A suspension device 10 of the torsion beam type will be described with reference to FIG. 1. In FIG. 1, VF (upward on the page) indicates the forward direction of a body 12 of a vehicle in which the suspension device 10 is installed, VB (downward on the page) indicates the backward direction of the body 12 in which the suspension device 10 is installed, VR (rightward on the page) indicates the rightward direction of the body 12, VL (leftward on the page) indicates the leftward direction of the body 12, VU (direction out of the page) indicates the upward direction of the body 12, and VD (direction into the page) indicates the downward direction of the body 12.

The suspension device 10 includes a pair of right and left trailing arms 14R, 14L, a torsion beam 16 connecting the pair of trailing arms 14R, 14L with each other, and a pair of spring seats 18R, 18L each supporting the lower end of a coil spring (not illustrated).

The trailing arms 14R, 14L has respective cylindrical portions 20R, 20L, which are formed at respective ends of the trailing arms 14R, 14L in the forward direction VF. Hereinafter, the pair of cylindrical portions 20R, 20L are also referred to as cylindrical portions 20. The axis (not illustrated) of the cylindrical portion 20R extends in the backward direction VB of the body 12 as the axis extends in the rightward direction VR of the body 12. The axis (not illustrated) of the cylindrical portion 20L extends in the backward direction VB of the body 12 as the axis extends in the leftward direction VL of the body 12.

Suspension bushes 28R, 28L are respectively press-fitted inside the cylindrical portions 20R, 20L. Hereinafter, the pair of suspension bushes 28R, 28L are also referred to as suspension bushes 28. When the suspension bushes 28 are press-fitted into the cylindrical portions 20, outer cylinders 30 (see FIG. 2) of the suspension bushes 28 are attached to the suspension device 10. On the other hand, inner cylinders 50 (see FIG. 4) of the suspension bushes 28 are attached to, for example, brackets 24 provided on the body 12 using bolts or the like.

In the state where the suspension bush 28R is press-fitted in the cylindrical portion 20R, the axis A of the suspension bush 28R extends in the backward direction VB of the body 12 as the axis A extends from the inside to the outside of the vehicle in the width direction, that is, in the rightward direction VR of the body 12. When the clockwise direction viewed from the upward direction VU is defined as a positive (+) direction, the inclination of the axis A of the suspension bush 28R with respect to the width direction of the vehicle ranges from about +27° to +33°, preferably about +30°. Similarly, in the state where the suspension bush 28L is press-fitted in the cylindrical portion 20L, the axis A of the suspension bush 28L extends in the backward direction VB of the body 12 as the axis A extends from the inside to the outside of the vehicle in the width direction, that is, in the leftward direction VL of the body 12. When the clockwise direction viewed from the upward direction VU is defined as the positive (+) direction, the inclination of the axis A of the suspension bush 28L with respect to the width direction of the vehicle ranges from about −27° to −33°, preferably about −30°. This structure enables the suspension device 10 to rotate around a virtual rotation center C set at a position in the backward direction VB behind the torsion beam 16.

Next, the suspension bush 28 according to two embodiments (first and second embodiments) will be described below.

2 First Embodiment 2.1 Structure of Suspension Bush 28

Figure 2:
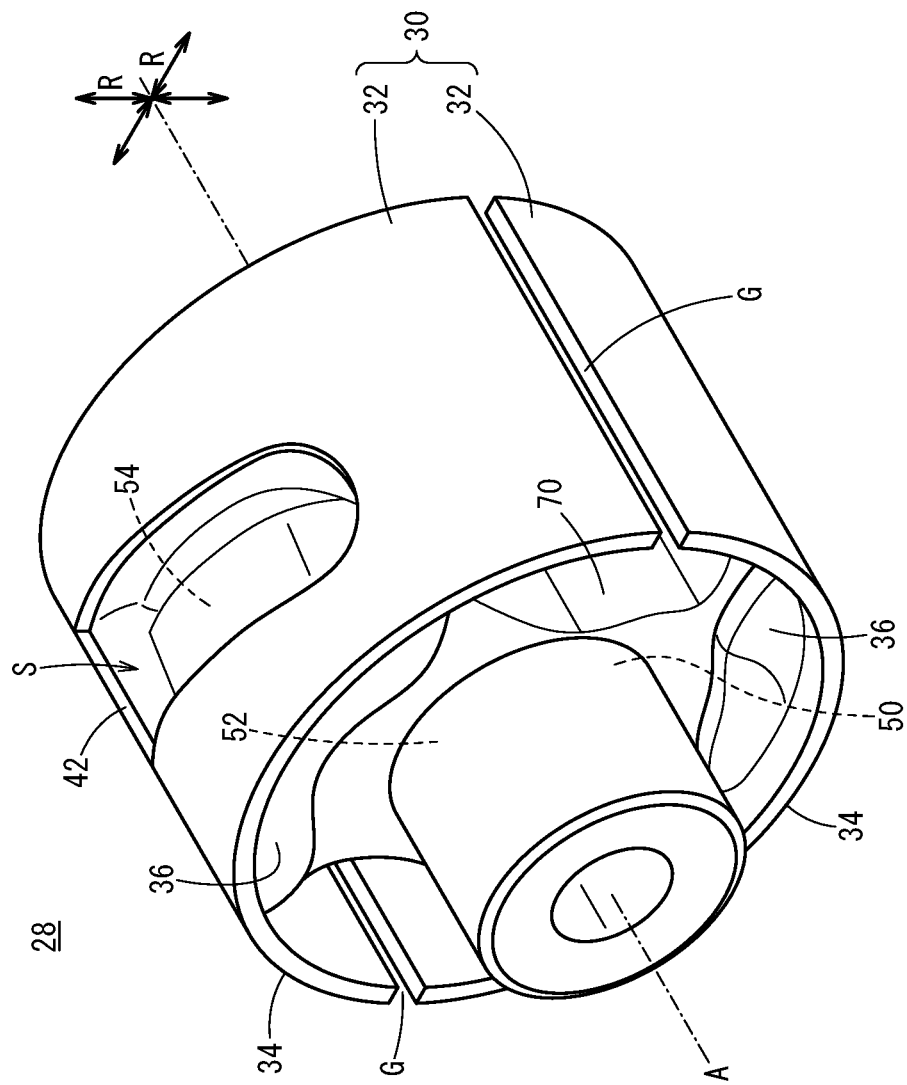
FIG. 2 is a perspective view of a suspension bush according to the present invention.
Figure 3:
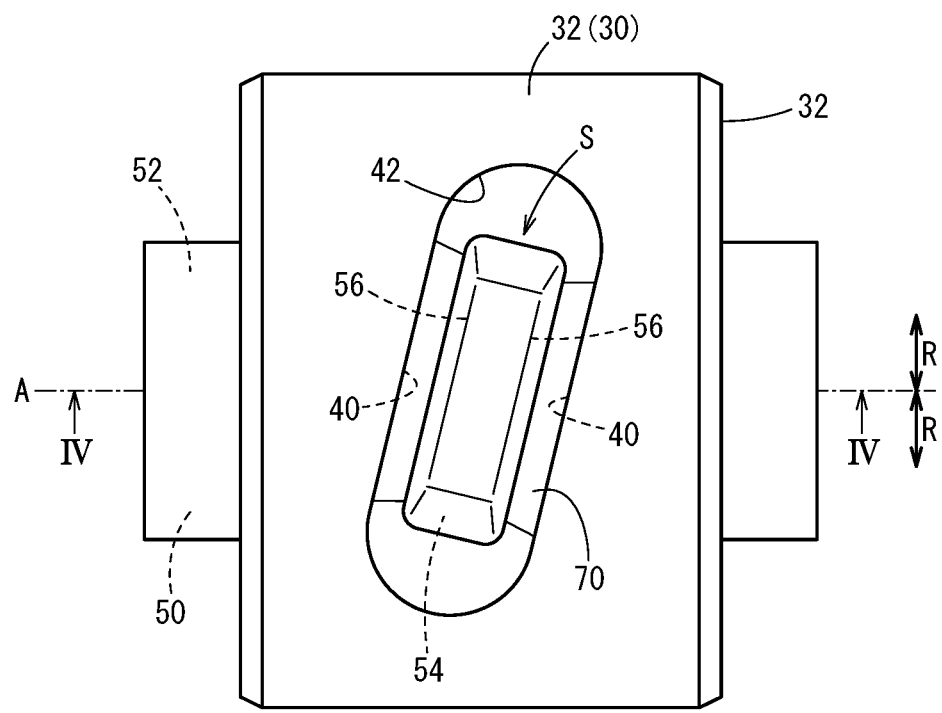
FIG. 3 is a plan view of the suspension bush according to the present invention.

The structure of the suspension bush 28 according to the first embodiment will now be described with reference to FIGS. 2 to 5, 6A, 6B, and 7. In FIGS. 2 and 3, the surface of the inner cylinder 50 is covered with an elastic member 70, and thus the inner cylinders 50 cannot be visually identified from the outside. Consequently, in FIGS. 2 and 3, components of the inner cylinder 50 covered with the elastic member 70 are indicated by reference numerals and symbols with broken leader lines.

The term "radial directions R" used below refers to radial directions of the suspension bush 28, the outer cylinder 30, and the inner cylinder 50. The term "inward in the radial directions R" refers to directions toward the center (axis A of the suspension bush 28) along the radial directions R, and the term "outward in the radial directions R" refers to directions diverging from the center along the radial directions R.

Figure 4:
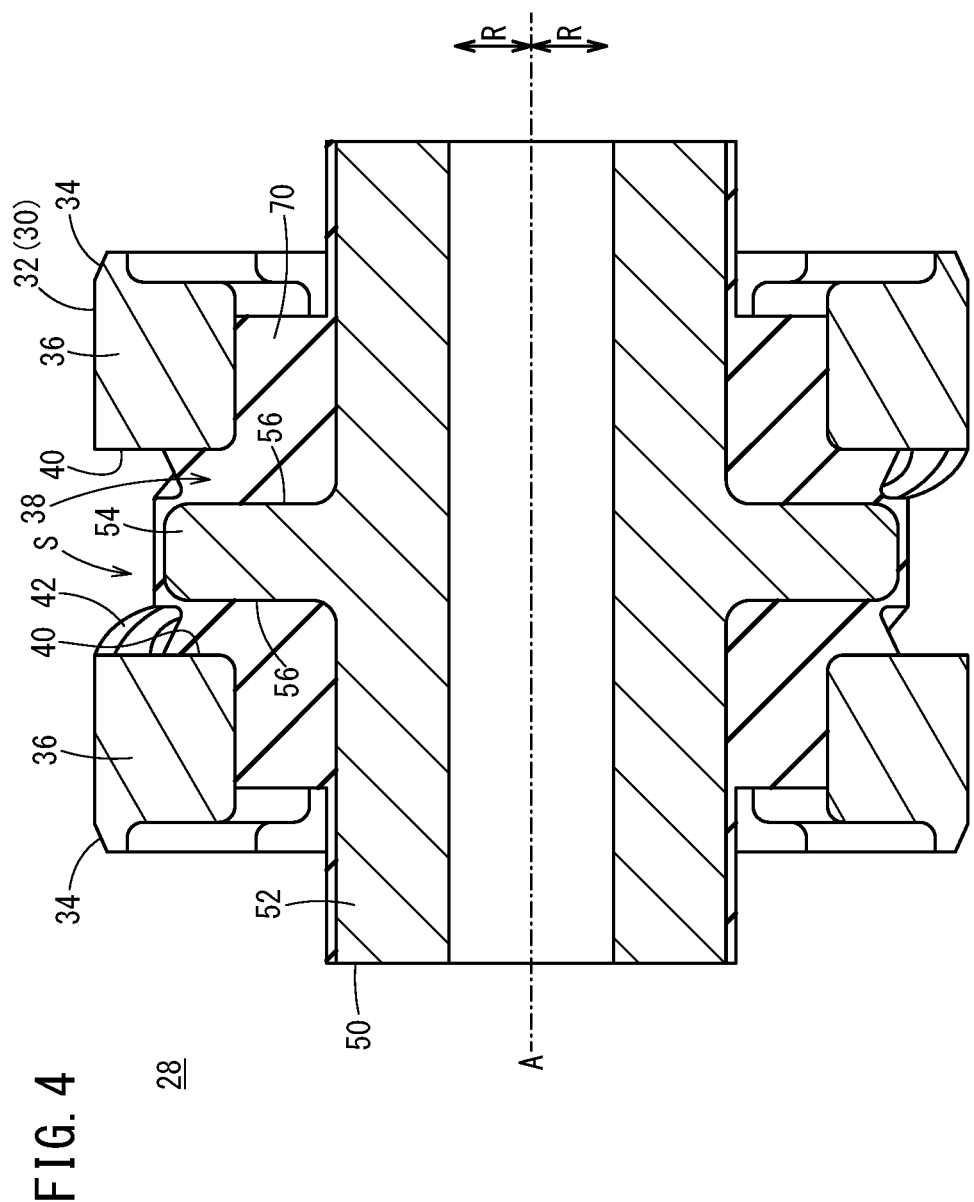
FIG. 4 is a cross-sectional view of a suspension bush of a first embodiment, and corresponds to a cross-sectional view take along line IV-IV in FIG. 3.

As illustrated in FIGS. 2 to 4, the suspension bush 28 includes the outer cylinder 30, the inner cylinder 50, and the elastic member 70. The outer cylinder 30 and the inner cylinder 50 are aligned with each other on the identical axis A, which serves as the axis A of the suspension bush 28. The inner cylinder 50 is supported by the elastic member 70 inside the outer cylinder 30. As described below, projections 54 of the inner cylinder 50 and slits 38 of the outer cylinder 30 form a screw mechanism. The outer cylinder 30 corresponds to an internal thread, and the inner cylinder 50 corresponds to an external thread. Thus, the outer cylinder 30 and the inner cylinder 50 can rotate relative to each other around the axis A within a range the elastic member 70 can extend.

The outer cylinder 30 is formed of semi-cylindrical split members 32, 32 divided into two parts in the radial directions R with the axis A at the center. The number of division of the outer cylinder 30 may be three or more. The outer cylinder 30 is preferably divided equally with the axis A at the center. For example, if the number of division is three, the outer cylinder 30 is preferably divided by 120° with the axis A at the center, and if the number of division is four, the outer cylinder 30 is preferably divided by 90° with the axis A at the center.

In the finished suspension bush 28, gaps G are left at positions where the outer cylinder 30 is divided. When the suspension bush 28 is press-fitted into the cylindrical portion 20, the split members 32, 32 are pushed inward in the radial directions R by the cylindrical portion 20. This closes the gaps G. In this state, the split members 32, 32 are pushed outward in the radial directions R by the elastic member 70. This causes the outer circumferential surfaces of the split members 32, 32 to be in close contact with the inner circumferential surface of the cylindrical portion 20.

Figure 5:
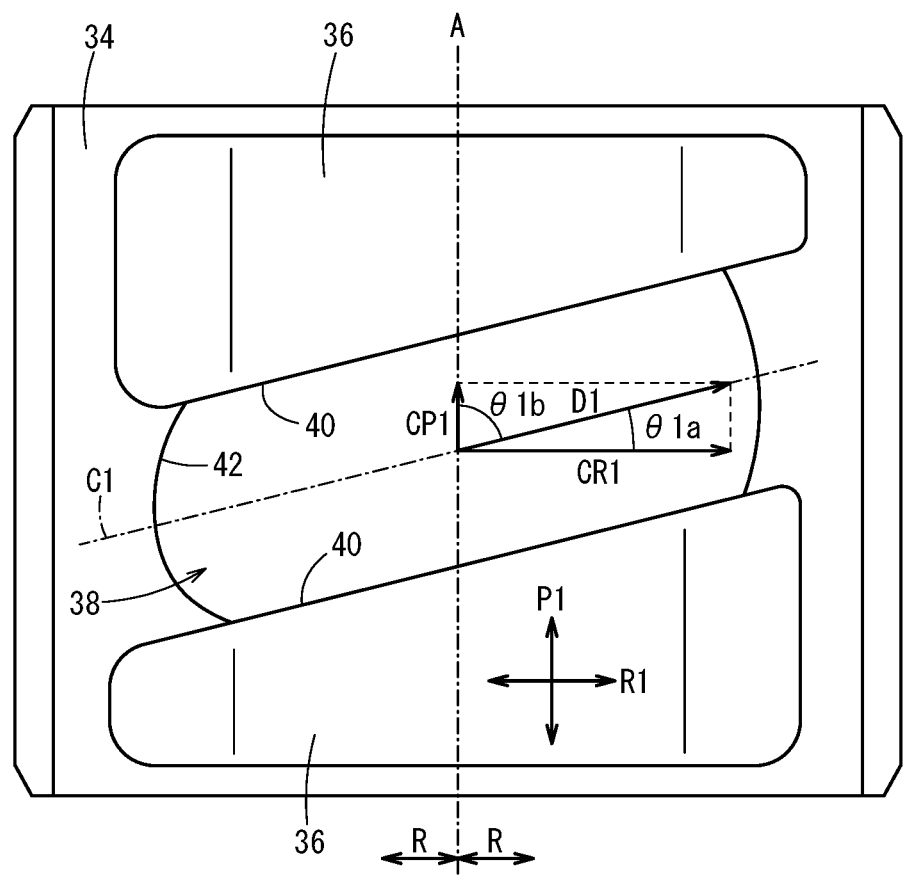
FIG. 5 illustrates an outer cylinder of the first embodiment viewed from the inner circumference thereof.

First, the split member 32 will be further described with reference to FIG. 5. The split member 32 is composed of metal or resin and includes a tubular part 34 defining the outer circumferential shape and a guide 36 protruding from the tubular part 34 inward in the radial directions R, the tubular part 34 and the guide 36 being integrated with each other. The guide 36 is formed in a range of substantially 90° with the axis A of the outer cylinder 30 at the center. The range can be set as appropriate. The guide 36 has a thickness in the radial directions R capable of accommodating the inner cylinder 50 and the elastic member 70 inside the guide 36 in the radial directions R. Moreover, a plurality of guides 36 may be disposed in parallel directions P1 parallel to the axis A.

The guide 36 has the slit 38 formed therein. The slit 38 corresponds to the thread groove of the screw mechanism. The slit 38 is formed such that the centerline C1 of the slit 38 in the longitudinal direction extends in a drawing direction D1 including a component CP1 in the parallel directions P1 parallel to the axis A and a component CR1 in circumferential directions R1 of the outer cylinder 30 with the axis A at the center. In other words, the centerline C1 of the slit 38 is inclined with respect to the parallel directions P1 and the circumferential directions R1. The angle $\theta 1a$ by which the centerline C1 of the slit 38 is inclined with respect to the circumferential directions R1 is smaller than the angle $\theta 1b$ by which the centerline C1 of the slit 38 is inclined with respect to the parallel directions P1. Specifically, the angle $\theta 1a$ is set in a range of 5° to 30°, and preferably set in a range of 10° to 20°. For example, the drawing direction D1 linearly or spirally extends along the outer cylinder 30 with the axis A at the center.

The slit 38 is formed by a pair of guide walls 40, 40 extending in the drawing direction D1 to be parallel to each other. As illustrated in FIG. 4, in a section including the axis A and parallel to the axis A, the guide walls 40 located adjacent to the slit 38 are parallel to the radial directions R. As illustrated in FIGS. 4 and 5, a hole 42 passing through the split member 32 to the outer circumferential surface thereof and extending in the drawing direction D1 is formed at the bottom of the slit 38.

Figure 6A:
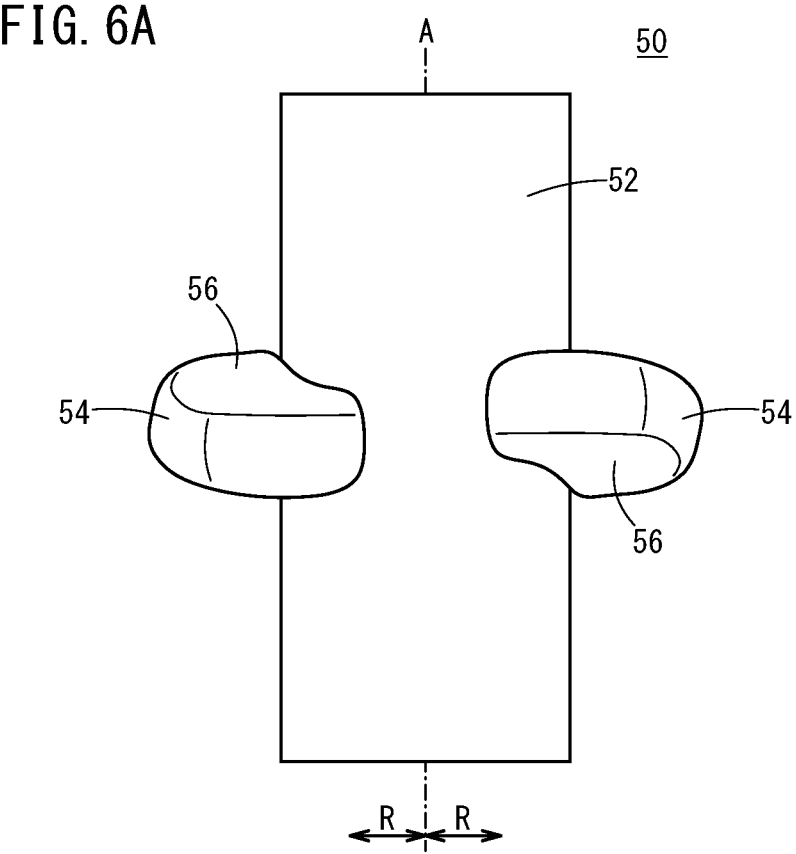
FIG. 6A is a right side view of an inner cylinder of the first embodiment.
Figure 6B:
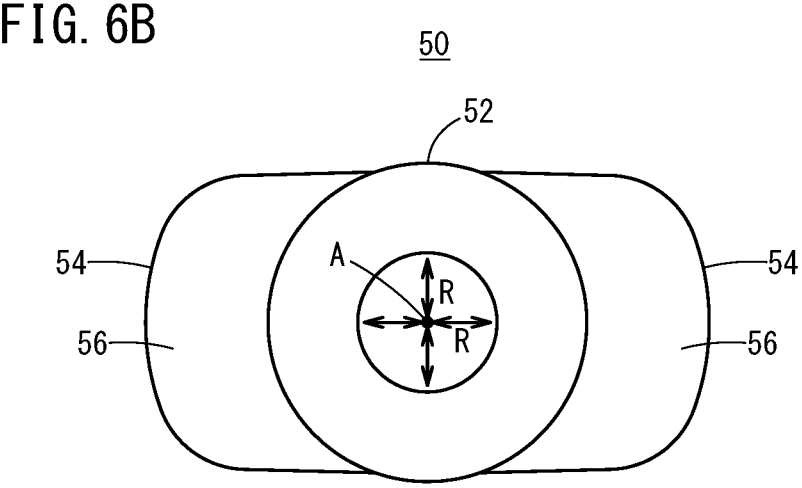
FIG. 6B is a front view of the inner cylinder.
Figure 7:
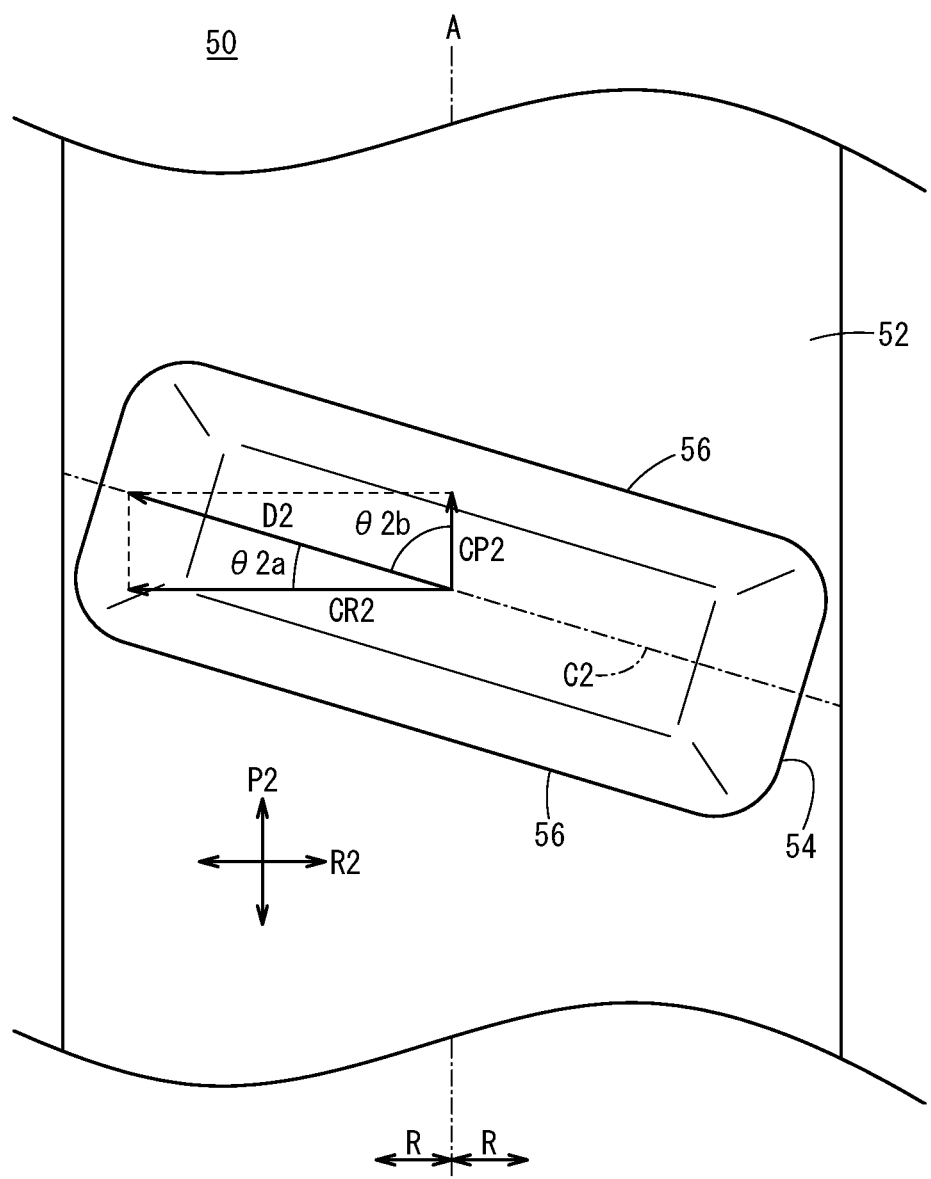
FIG. 7 is a plan view of a projection formed on the inner cylinder of the first embodiment.

Next, the inner cylinder 50 will be further described with reference to FIGS. 6A, 6B, and 7. The inner cylinder 50 is composed of metal or resin and includes a tubular part 52 defining the outer circumferential shape and the two projections 54, 54 protruding from the tubular part 52 outward in the radial directions R, the tubular part 52 and the projections 54 being integrated with each other. The number of projections 54 may be three or more. The plurality of projections 54 are disposed at regular intervals along the outer circumference of the inner cylinder 50 with the axis A at the center. Moreover, the plurality of projections 54 may be disposed in parallel directions P2 parallel to the axis A.

The projections 54 correspond to the threads of the screw mechanism. As are the slits 38 of the outer cylinder 30, each of the projections 54 is formed such that the centerline C2 of the projection 54 in the longitudinal direction extends in a drawing direction D2 including a component CP2 in the parallel directions P2 parallel to the axis A and a component CR2 in the circumferential directions R2 of the inner cylinder 50 with the axis A at the center. In other words, the centerline C2 of the projection 54 is inclined with respect to the parallel directions P2 and the circumferential directions R2. The angle θ2a by which the centerline C2 of the projection 54 is inclined with respect to the circumferential directions R2 is smaller than the angle θ2b by which the centerline C2 of the projection 54 is inclined with respect to the parallel directions P2. The angle θ2a is set identical to the angle θ1a described above by which the centerline C1 of the slit 38 is inclined. Specifically, the angle θ2a is set in a range of 5° to 30°, and preferably set in a range of 10° to 20°. For example, the drawing direction D2 linearly or spirally extends along the inner cylinder 50 with the axis A at the center.

The projection 54 includes a pair of projection walls 56, 56 extending in the drawing direction D2 to be parallel to each other. As illustrated in FIG. 4, in the section including the axis A and parallel to the axis A, the projection walls 56 located adjacent to the slit 38 are parallel to the radial directions R.

As illustrated in FIG. 4, the elastic member 70 lies between the outer cylinder 30 and the inner cylinder 50, that is, the elastic member is interposed between the inner circumference of the outer cylinder 30 and the outer circumference of the inner cylinder 50. The elastic member 70 is an elastically deformable member, for example, rubber. The elastic member 70 composed of rubber is shaped as follows. First, a cavity with a predetermined shape is formed between the outer cylinder 30 and the inner cylinder 50 using a die. Next, molten unvulcanized compounded rubber (rubber compound) is pressure-injected into the cavity. The rubber is vulcanized to adhere to the outer cylinder 30 and the inner cylinder 50. The rotatability of the inner cylinder 50 with respect to the outer cylinder 30 changes depending on the shape of the rubber, the filling area of the rubber, and the like. Thus, the shape of the rubber, the filling area of the rubber, and the like are set as appropriate. Here, the rubber is vulcanized to adhere to part of the inner circumferential surface of the outer cylinder 30 (including the surfaces of the guides 36 and not including the vicinity of the gaps G) and the entire outer circumferential surface of the inner cylinder 50 (including the surfaces of the projections 54).

As illustrated in FIG. 4, in the finished suspension bush 28, the projections 54 are disposed in the slits 38. In this state, the projection walls 56 and the guide walls 40 face each other. Moreover, the elastic member 70 does not close the holes 42 in the outer cylinder 30. That is, spaces S that are not filled with the elastic member 70 are left in part of the holes 42 and the slits 38.

Figure 8A:
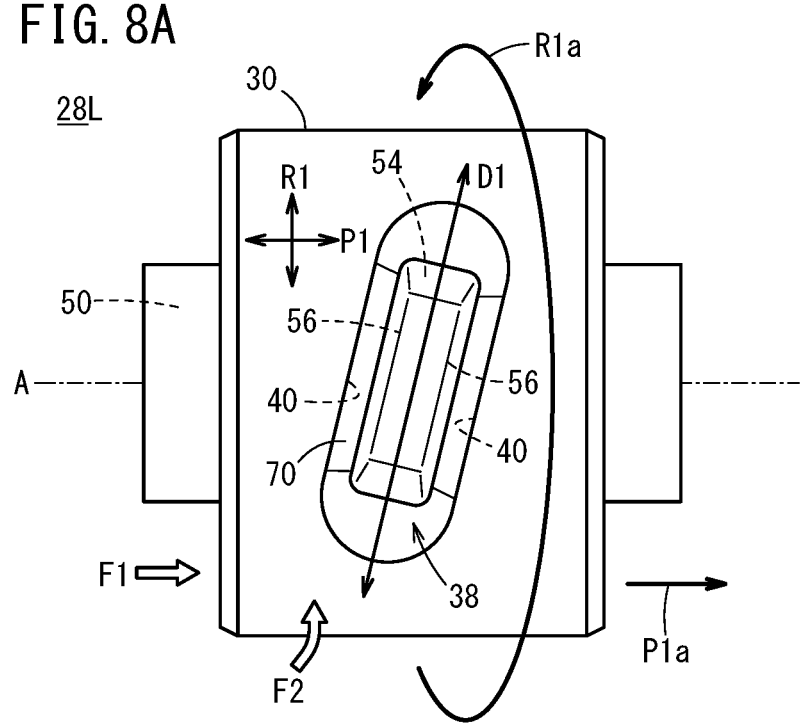
FIG. 8A is an explanatory diagram illustrating how the suspension bush disposed on the left side of the suspension device operates.

In the suspension device 10, the suspension bush 28L provided for the trailing arm 14L on the left and the suspension bush 28R provided for the trailing arm 14R on the right are disposed opposite to each other. The suspension bush 28L on the left is disposed in a direction to form a left-handed screw mechanism. When FIG. 8A is taken as an example, the direction of the projection 54 and the direction of the slit 38 are set such that, when the inner cylinder 50 rotates counterclockwise with respect to the outer cylinder 30 about the axis A as viewed from one end surface, the inner cylinder 50 is displaced toward the other end surface.

Figure 8B:
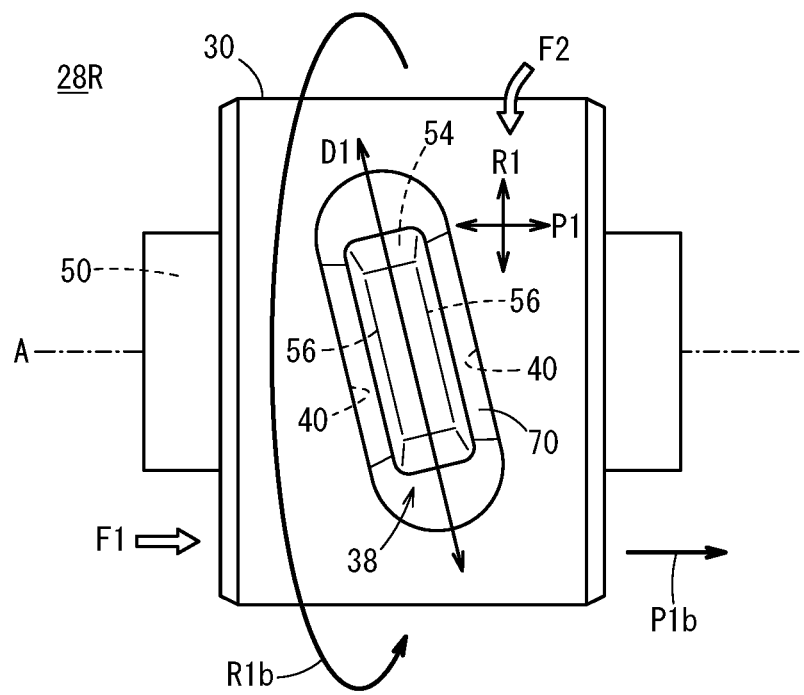
FIG. 8B is an explanatory diagram illustrating how the suspension bush disposed on the right side of the suspension device operates.
Figure 10:
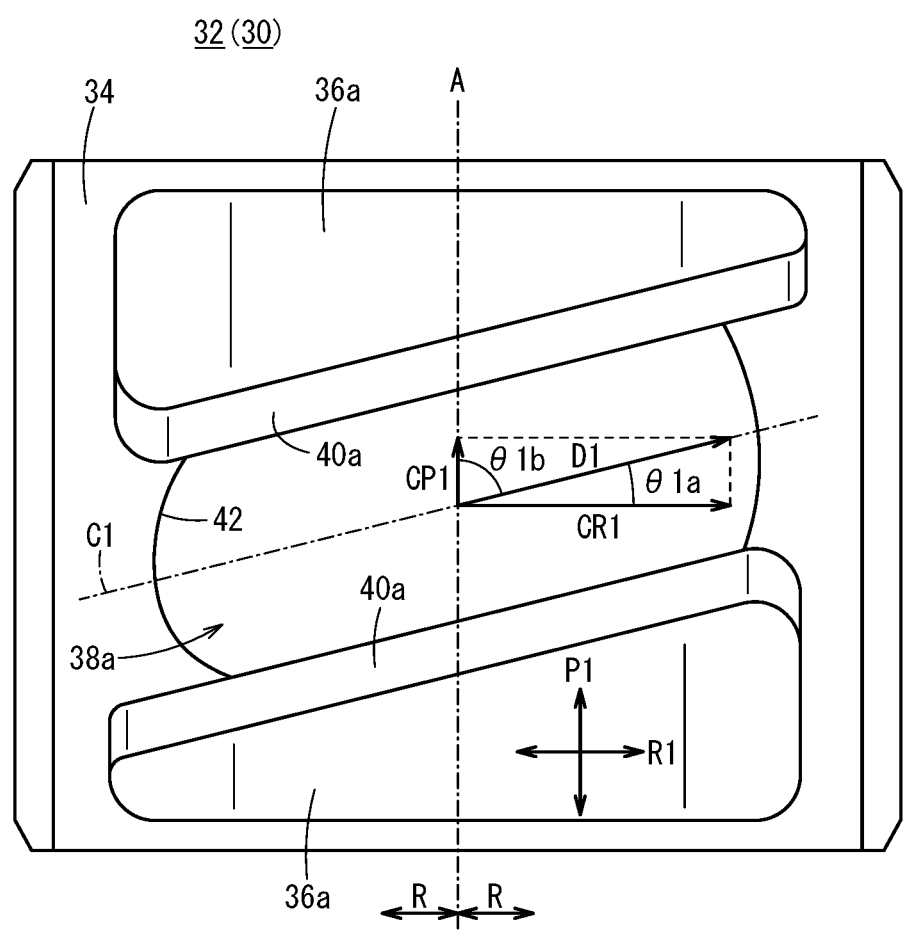
FIG. 10 illustrates an outer cylinder of the second embodiment viewed from the inner circumference thereof.
Figure 11A:
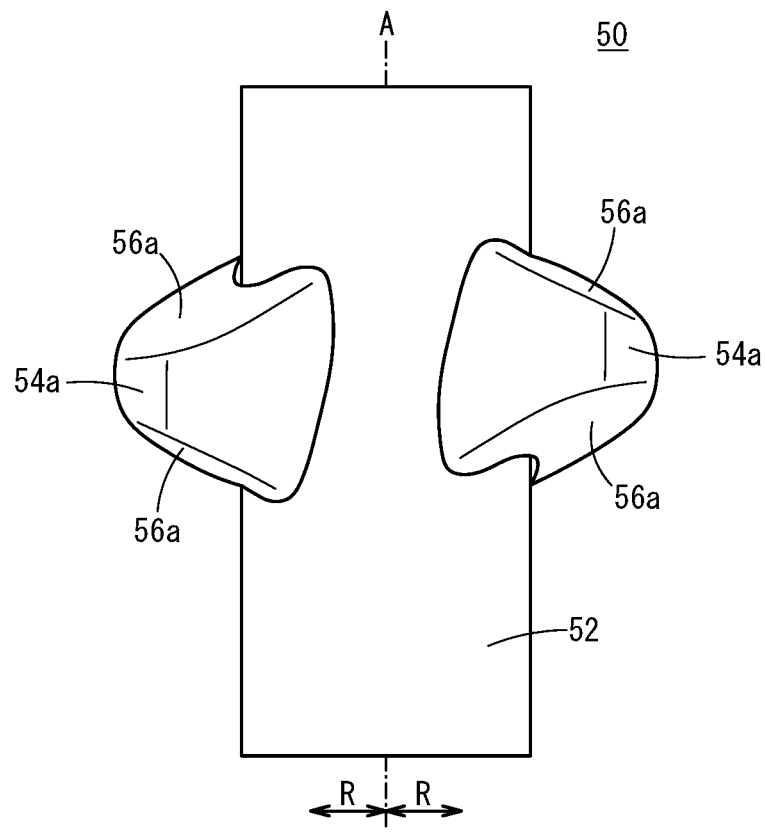
FIG. 11A is a right side view of an inner cylinder of the second embodiment.
Figure 11B:
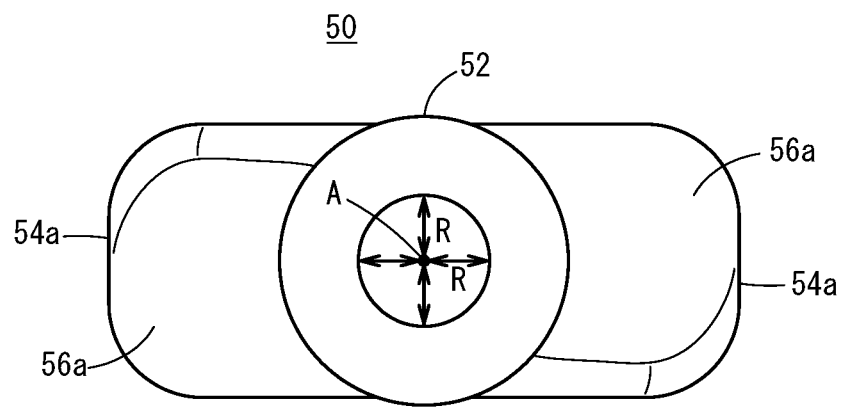
FIG. 11B is a front view of the inner cylinder.
Figure 12:
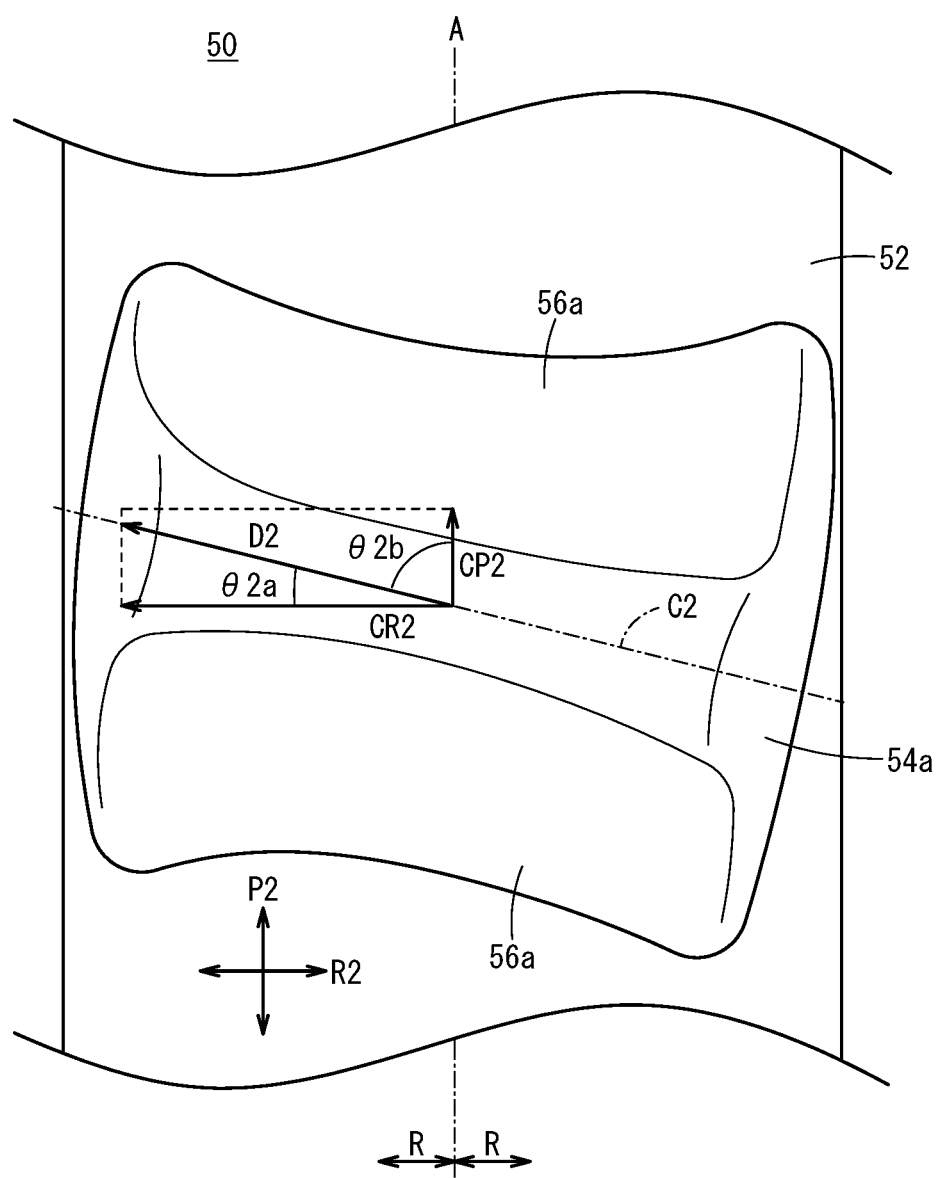
FIG. 12 is a plan view of a projection formed on the inner cylinder of the second embodiment.

Moreover, the suspension bush 28R on the right is disposed in a direction to form a right-handed screw mechanism. When FIG. 8B is taken as an example, the direction of the projection 54 and the direction of the slit 38 are set such that, when the inner cylinder 50 rotates clockwise with respect to the outer cylinder 30 about the axis A as viewed from one end surface, the inner cylinder 50 is displaced toward the other end surface.

2.2 Operations of Suspension Device 10 and Suspension Bush 28

Operations of the suspension device 10 and the suspension bushes 28 will be described with reference to FIGS. 1, 4, 8A, and 8B. Let us assume that the vehicle is being steered in the rightward direction VR to turn in a T direction as illustrated in FIG. 1.

2.2.1 Operations at Beginning of Turn

At the beginning of a turn, a lateral force SF in the rightward direction VR acts on the suspension device 10. Then, as illustrated in FIG. 8A, an external force F1 in the parallel directions P1 parallel to the axis A caused by the lateral force SF acts on the outer cylinder 30 of the suspension bush 28L disposed on the left. At this time, although the outer cylinder 30 is likely to be displaced in a direction P1a toward the inside of the vehicle in response to the external force F1, the projection walls 56 (see FIG. 4) come into abutment against the guide walls 40 (see FIG. 4) via the elastic member 70. That is, the projections 54 of the inner cylinder 50 attached to the vehicle body 12 restrict the movement of the guides 36 of the outer cylinder 30 attached to the suspension device 10. Thus, the outer cylinder 30 is hardly displaced in the direction P1a toward the inside of the vehicle. The suspension bush 28R disposed on the right operates in a similar manner. Thus, the displacement of the suspension device 10 in the rightward direction VR is prevented.

2.2.2 Operations after Turn Proceeds

As the turn in the rightward direction VR proceeds, the vehicle rolls. In a case where the vehicle turns in the T direction and rolls, the wheel on the left bumps and the wheel on the right rebounds.

Operations of Suspension Bush 28 on Bump Side

As illustrated in FIG. 8A, an external force F2 in one of the circumferential directions R1 (clockwise when viewed from the right side on the page) acts on the outer cylinder 30 of the suspension bush 28L disposed on the left. At this time, although the outer cylinder 30 is likely to be rotated in response to the external force F2, the projection walls 56 (see FIG. 4) come into abutment against the guide walls 40 (see FIG. 4) via the elastic member 70. That is, the projections 54 of the inner cylinder 50 attached to the body 12 restrict the movement of the guides 36 of the outer cylinder 30 attached to the suspension device 10. At this time, the guides 36 are displaced in the drawing directions D1 thereof. As a result, the outer cylinder 30 is displaced in the direction P1a toward the inside of the vehicle while rotating in one direction R1a of the circumferential directions R1.

Operations of Suspension Bush 28 on Rebound Side

As illustrated in FIG. 8B, the external force F2 in another direction of the circumferential directions R1 (counterclockwise when viewed from the right side on the page) acts on the outer cylinder 30 of the suspension bush 28R disposed on the right. At this time, although the outer cylinder 30 is likely to be rotated in response to the external force F2, the projection walls 56 (see FIG. 4) come into abutment against the guide walls 40 (see FIG. 4) via the elastic member 70. That is, the projections 54 of the inner cylinder 50 attached to the body 12 restrict the movement of the guides 36 of the outer cylinder 30 attached to the suspension device 10. At this time, the guides 36 are displaced in the drawing directions D1 thereof. As a result, the outer cylinder 30 is displaced in a direction P1b toward the outside of the vehicle while rotating in another direction R1b of the circumferential directions R1.

Operations of Suspension Device 10

In the case where the wheel on the left bumps and the wheel on the right rebounds, as described above, the outer cylinder 30 of the suspension bush 28L disposed on the left is displaced in the direction P1a toward the inside of the vehicle, and the outer cylinder 30 of the suspension bush 28R disposed on the right is displaced in the direction P1b toward the outside of the vehicle. Then, as illustrated in FIG. 1, the suspension device 10 rotates clockwise around the virtual rotation center C set at the position in the backward direction VB behind the torsion beam 16. As a result, the rear wheels (not illustrated) form toe angles toward the inside of the turn.

2.3 Conclusion of First Embodiment

The suspension bush 28 according to the first embodiment includes the inner cylinder 50 and the outer cylinder 30 aligned with each other on the identical axis A and the elastic member 70 lying between the inner cylinder 50 and the outer cylinder 30. The inner cylinder 50 includes the projections 54 formed on the outer circumference thereof. The outer cylinder 30 includes the guides 36 formed on the inner circumference thereof. As illustrated in FIG. 5, each of the guides 36 has the slit 38 formed therein in the drawing direction D1 including the component CP1 in the parallel directions P1 parallel to the axis A and the component CR1 in the circumferential directions R1 about the axis A. The projections 54 are disposed in the slits 38, and the projections 54 and the slits 38 forming a screw mechanism.

In the above-described structure, in the case where the external force F1 in the parallel directions P1 parallel to the axis A acts on the outer cylinder 30 as illustrated in FIGS. 8A and 8B, the projections 54 restrict the movement of the guides 36 to thereby prevent the displacement of the outer cylinder 30 in the parallel directions P1 (the direction P1a toward the inside of the vehicle or the direction P1b toward the outside of the vehicle). Moreover, in the case where the external force F2 in the circumferential directions R1 about the axis A acts on the outer cylinder 30, the projections 54 restrict the movement of the guides 36 to thereby allow the outer cylinder 30 to be displaced in the parallel directions P1 while the outer cylinder 30 rotates in the one direction R1a or the other direction R1b of the circumferential directions R1.

According to the above-described structure, in the case where the external force F1 in the parallel directions P1 parallel to the axis A acts on the outer cylinder 30, the outer cylinder 30 can be prevented from being displaced along the axis A. Moreover, in the case where the external force F2 in the circumferential directions R1 acts on the outer cylinder 30, the outer cylinder 30 can be displaced along the axis A while rotating.

More specifically, the angle $\theta 1a$ by which the centerline C1 of the slit 38 is inclined with respect to the circumferential directions R1 is smaller than the angle $\theta 1b$ by which the centerline C1 of the slit 38 is inclined with respect to the parallel directions P1. Thus, the outer cylinder 30 can be prevented from being displaced along the axis A against the external force F1 in the parallel directions P1, and the outer cylinder 30 can be displaced along the axis A while rotating in response to the external force F2 in the circumferential directions R1.

The outer cylinder 30 is formed of the plurality of split members 32 divided in the radial directions R of the outer cylinder 30. According to the above-described structure, the projections 54 of the inner cylinder 50 can be easily disposed in the slits 38 of the outer cylinder 30 compared with a case using an integrally-formed outer cylinder.

According to the suspension device 10 provided with the suspension bushes 28, the outer cylinder 30 of each suspension bush 28 can be prevented from being displaced along the axis A in the case where the lateral force SF acts on the wheels at the beginning of a turn. Moreover, in the case where the wheels bump or rebound to thereby cause the external force F2 in the circumferential directions R1 to act on the outer cylinder 30 of each suspension bush 28, the outer cylinder 30 can be displaced along the axis A while rotating. Thus, the suspension device 10 enables the toe angles to be changed toward the inside of the turn while resisting the lateral force SF generated during the turn. This provides excellent handling and stability of the vehicle in a compatible manner while the vehicle turns.

Moreover, the spaces S prevent excessive compression of the elastic member 70. This allows the outer cylinder 30 and the inner cylinder 50 to easily rotate relative to each other.

3 Second Embodiment 3.1 Structure of Suspension Bush 28

The structure of the suspension bush 28 according to a second embodiment will now be described with reference to FIGS. 9, 10, 11A, 11B, and 12. In the description below, the same reference numerals and symbols are used for structures corresponding to those in the suspension bush 28 according to the first embodiment, and the detailed descriptions will be omitted.

In the suspension bush 28 according to the second embodiment, the shape of guides 36a formed on the outer cylinder 30 and the shape of projections 54a formed on the inner cylinder 50 are different from those in the suspension bush 28 according to the first embodiment. Specifically, the inclination angles of guide walls 40a and the inclination angles of projection walls 56a with respect to the radial directions R are different from those in the suspension bush 28 according to the first embodiment.

In each of the split members 32, the pair of guide walls 40a, 40a form a slit 38a. As illustrated in FIG. 9, in a plane cross section including the axis A and parallel to the axis A, the guide walls 40a located adjacent to the slit 38a are inclined with respect to the outer circumferential surface and the radial directions R of the outer cylinder 30. The inclination directions of the pair of guide walls 40a, 40a are different from each other. Specifically, the pair of guide walls 40a, 40a are inclined such that the opening of the slit 38a progressively decreases outwardly in the radial direction R and the opening of the slit 38a progressively increases inwardly in the radial direction R.

The projections 54a of the inner cylinder 50 each include the pair of projection walls 56a, 56a. As illustrated in FIG. 9, in the plane cross section including the axis A and parallel to the axis A, the projection walls 56a located adjacent to the slit 38a are inclined with respect to the outer circumferential surface and the radial directions R of the inner cylinder 50. The inclination directions of the pair of projection walls 56a, 56a are different from each other. Specifically, the pair of projection walls 56a, 56a are inclined such that the width of the projection 54a progressively decreases outwardly in the radial direction R and the width of the projection 54a progressively increases inwardly in the radial direction R.

In the finished suspension bush 28, the projections 54a are disposed in the slits 38a. In this state, the projection walls 56a and the guide walls 40a face each other. Moreover, the elastic member 70 does not close the holes 42 in the outer cylinder 30. That is, the spaces S that are not filled with the elastic member 70 are left in part of the holes 42 and the slits 38a.

3.2 Comparison Between First Embodiment and Second Embodiment

The suspension bush 28 according to the second embodiment operates in a manner similar to the suspension bush 28 according to the first embodiment. Here, the first embodiment (see FIG. 4) and the second embodiment (see FIG. 9) are compared by focusing on forces acting on the elastic member 70. When the suspension bush 28 is press-fitted into the cylindrical portion 20, the split members 32 are pushed inward in the radial directions R. In this state, in the suspension bush 28 according to the first embodiment, the elastic member 70 lying between the guide walls 40 and the projection walls 56 is subjected to shear stress. On the other hand, in the suspension bush 28 according to the second embodiment, the elastic member 70 lying between the guide walls 40a and the projection walls 56a is subjected to compressive load. Thus, the elastic member 70 of the suspension bush 28 according to the second embodiment has increased durability compared with that of the suspension bush 28 according to the first embodiment.

3.3 Conclusion of Second Embodiment

The suspension bush 28 according to the second embodiment produces effects equal to those of the suspension bush 28 according to the first embodiment. Furthermore, in the suspension bush 28 according to the second embodiment, in the plane cross section including the axis A and parallel to the axis A, the guide walls 40a located adjacent to the slits 38a are inclined with respect to the radial directions R of the outer cylinder 30, and the projection walls 56a located adjacent to the slits 38a are inclined with respect to the radial directions R of the inner cylinder 50. In addition, the guide walls 40a and the projection walls 56a facing each other are inclined in the same direction. According to the above-described structure, the elastic member 70 lying between the guide walls 40a and the projection walls 56a receives compressive load from the guide walls 40a and the projection walls 56a. Thus, the durability of the elastic member 70 is increased compared with the case where the guide walls 40 are not inclined with respect to the radial directions R of the outer cylinder 30 and the projection walls 56 are not inclined with respect to the radial directions R of the inner cylinder 50 (see FIG. 4).

4 Modification

In the suspension device 10 illustrate in FIG. 1, the right suspension bush 28R is inclined in the positive direction with respect to the width direction of the vehicle, and the left suspension bush 28L is inclined in the negative direction with respect to the width direction of the vehicle. Conversely, the right suspension bush 28R may be inclined in the negative direction with respect to the width direction of the vehicle, and the left suspension bush 28L may be inclined in the positive direction with respect to the width direction of the vehicle. The embodiment will be described with reference to FIG. 13. In a suspension device 110 illustrated in FIG. 13, the same reference numerals and symbols are used for structures identical to those in the suspension device 10 illustrated in FIG. 1, and the detailed descriptions will be omitted.

Cylindrical portions 120R, 120L are respectively formed at ends of the trailing arms 14R, 14L that are located in the forward direction VF. The axis (not illustrated) of the cylindrical portion 120R extends in the forward direction VF of the vehicle body 12 as the axis extends in the rightward direction VR of the vehicle body 12. The axis (not illustrated) of the cylindrical portion 120L extends in the forward direction VF of the vehicle body 12 as the axis extends in the leftward direction VL of the body 12. The suspension bushes 28R, 28L are respectively press-fitted inside the cylindrical portions 120R, 120L.

In the state where the suspension bush 28R is press-fitted in the cylindrical portion 120R, the axis A of the suspension bush 28R extends in the forward direction VF of the body 12 as the axis A extends from the inside to the outside of the vehicle in the width direction, that is, in the rightward direction VR of the body 12. When the clockwise direction viewed from the upward direction VU is defined as the positive direction, the inclination of the axis A of the suspension bush 28R with respect to the width direction of the vehicle ranges from about −27° to −33°, preferably about −30°. Similarly, in the state where the suspension bush 28L is press-fitted in the cylindrical portion 120L, the axis A of the suspension bush 28L extends in the forward direction VF of the body 12 as the axis A extends from the inside to the outside of the vehicle in the width direction, that is, in the leftward direction VL of the body 12. When the clockwise direction viewed from the upward direction VU is defined as the positive direction, the inclination of the axis A of the suspension bush 28L with respect to the width direction of the vehicle ranges from about +27° to +33°, preferably about +30°. This structure enables the suspension device 110 to rotate around a virtual rotation center C' set at a position in the forward direction VF in front of the torsion beam 16.

In the suspension device 110, the suspension bush 28L provided for the left trailing arm 14L and the suspension bush 28R provided for the right trailing arm 14R are disposed opposite to each other. The left suspension bush 28L is disposed in a direction to form a right-handed screw mechanism. Moreover, the right suspension bush 28R is disposed in a direction to form a left-handed screw mechanism.

Figure 13:
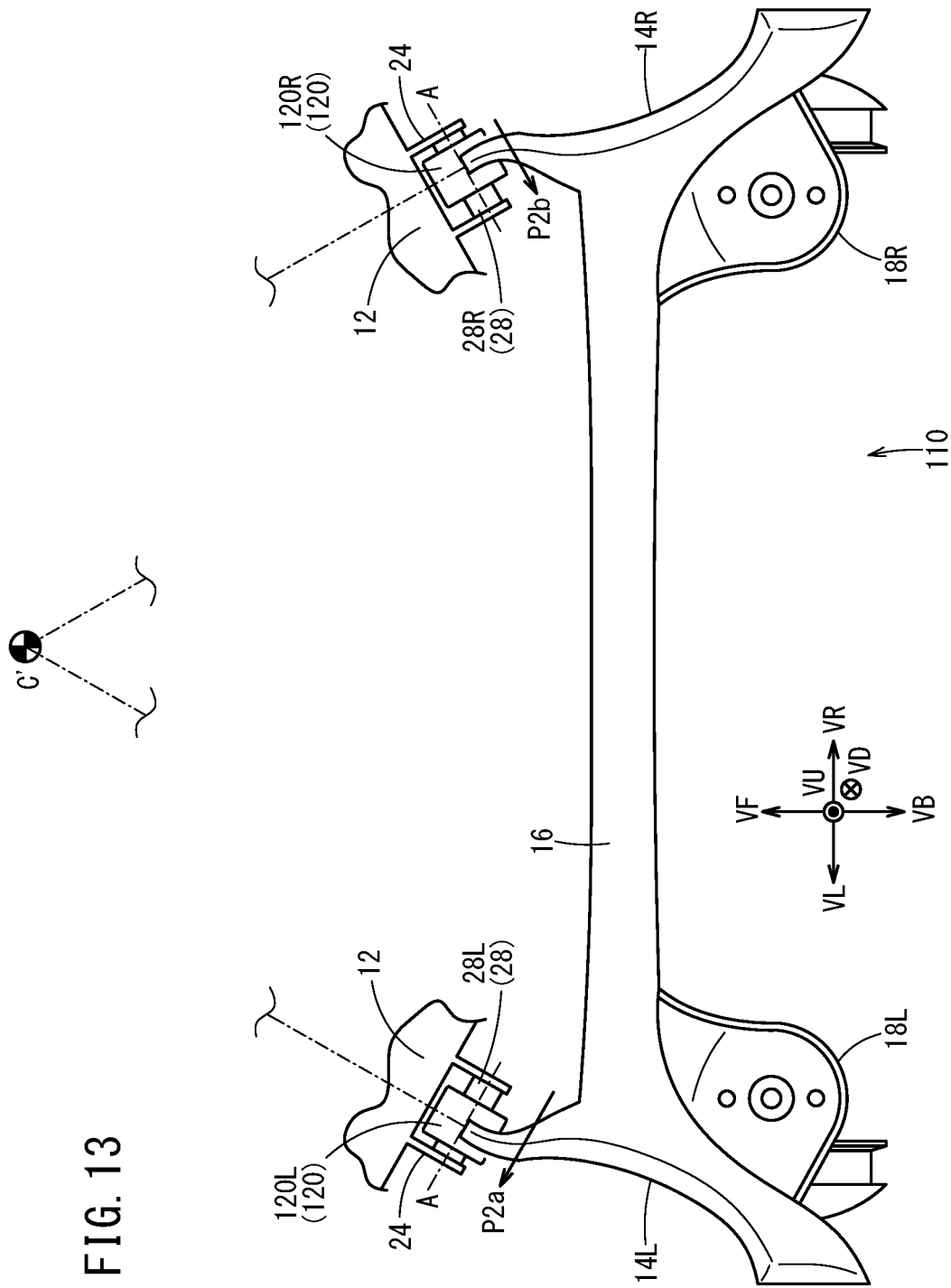
FIG. 13 is a plan view of a suspension device different from the suspension device in FIG. 1.

With this structure, in the case where the wheel on the left bumps and the wheel on the right rebounds, the outer cylinder 30 of the suspension bush 28L disposed on the left is displaced in a direction P2a toward the outside of the vehicle, and the outer cylinder 30 of the suspension bush 28R disposed on the right is displaced in a direction P2b toward the inside of the vehicle. Then, as illustrated in FIG. 13, the suspension device 110 rotates clockwise around the virtual rotation center C' set at the position in the forward direction VF in front of the torsion beam 16. As a result, the rear wheels (not illustrated) form toe angles toward the inside of the turn.

The projections 54 formed on the inner cylinder 50 each include the pair of projection walls 56 parallel to the drawing direction D2. However, the pair of projection walls 56 may not be parallel to the drawing direction D2. For example, the projections 54 may be circular or elliptic cylinders protruding outward in the radial directions R of the inner cylinder 50.

In the first and second embodiments, the suspension bushes 28 are provided on the suspension device 10 of the torsion beam type. However, the suspension bushes 28 can also be used for suspension devices of other types.

The suspension bush and the suspension device according to the present invention are not limited in particular to the embodiments described above, and may adopt various structures without departing from the scope of the present invention as a matter of course.

The invention claimed is:

1. A suspension bush, comprising:
an inner cylinder and an outer cylinder aligned with each other on an identical axis; and
an elastic member lying between the inner cylinder and the outer cylinder, wherein:
a projection is formed on an outer circumference of the inner cylinder;
a guide is formed on an inner circumference of the outer cylinder;
a slit is formed in the guide in a drawing direction including a parallel component parallel to the axis and a circumferential component with the axis at a center;
the projection is disposed in the slit;
the projection and the slit form a screw mechanism; and
an angle by which a centerline of the slit is inclined with respect to a circumferential directions of the outer cylinder is smaller than an angle by which the centerline is inclined with respect to a parallel directions parallel to the axis of the outer cylinder.

2. The suspension bush according to claim 1, wherein the outer cylinder includes a plurality of split members divided in a radial direction of the outer cylinder.

3. The suspension bush according to claim 2, wherein:
in a plane cross section including the axis and parallel to the axis:
a guide wall located adjacent to the slit is inclined with respect to the radial direction of the outer cylinder;
a projection wall located adjacent to the slit is inclined with respect to a radial direction of the inner cylinder; and
the guide wall and the projection wall facing each other are inclined in an identical direction.

4. A suspension device of a torsion beam type, for supporting a pair of left and right trailing arms using suspension bushes so as to be swingable with respect to a body of a vehicle;
wherein axes of the suspension bushes extend toward a back of the body as the axes extend from an inside to an outside in a width direction of the vehicle;
wherein each of the suspension bushes includes:
an inner cylinder attached to the body;
an outer cylinder aligned with the inner cylinder on an identical axis and attached to the corresponding trailing arm; and
an elastic member lying between the inner cylinder and the outer cylinder;
wherein a projection is formed on an outer circumference of the inner cylinder;
wherein a guide is formed on an inner circumference of the outer cylinder;
wherein a slit is formed in the guide in a drawing direction including a parallel component parallel to the axis and a circumferential component with the axis at a center;
wherein the projection is disposed in the slit;
wherein the projection and the slit form a screw mechanism;
wherein an angle by which a centerline of the slit is inclined with respect to a circumferential directions of the outer cylinder is smaller than an angle by which the centerline is inclined with respect to a parallel directions parallel to the axis of the outer cylinder; and
wherein, of the pair of left and right trailing arms, the screw mechanism of the suspension bush provided on the left trailing arm disposed on a left side of the body is a left-handed screw mechanism, and the screw mechanism of the suspension bush provided on the right trailing arm disposed on a right side of the body is a right-handed screw mechanism.

5. A suspension device of a torsion beam type, for supporting a pair of left and right trailing arms using suspension bushes so as to be swingable with respect to a body of a vehicle;
wherein axes of the suspension bushes extend toward a front of the body as the axes extend from an inside to an outside in a width direction of the vehicle;
wherein each of the suspension bushes includes:
an inner cylinder attached to the body;
an outer cylinder aligned with the inner cylinder on an identical axis and attached to the corresponding trailing arm; and
an elastic member lying between the inner cylinder and the outer cylinder;
wherein a projection is formed on an outer circumference of the inner cylinder;
wherein a guide is formed on an inner circumference of the outer cylinder;
wherein a slit is formed in the guide in a drawing direction including a parallel component parallel to the axis and a circumferential component with the axis at a center;
wherein the projection is disposed in the slit;
wherein the projection and the slit form a screw mechanism;
wherein an angle by which a centerline of the slit is inclined with respect to a circumferential directions of the outer cylinder is smaller than an angle by which the centerline is inclined with respect to a parallel directions parallel to the axis of the outer cylinder; and
wherein, of the pair of left and right trailing arms, the screw mechanism of the suspension bush provided on the left trailing arm disposed on a left side of the body is a right-handed screw mechanism, and the screw mechanism of the suspension bush provided on the right trailing arm disposed on a right side of the body is a left-handed screw mechanism.

* * * * *